Figure 1:
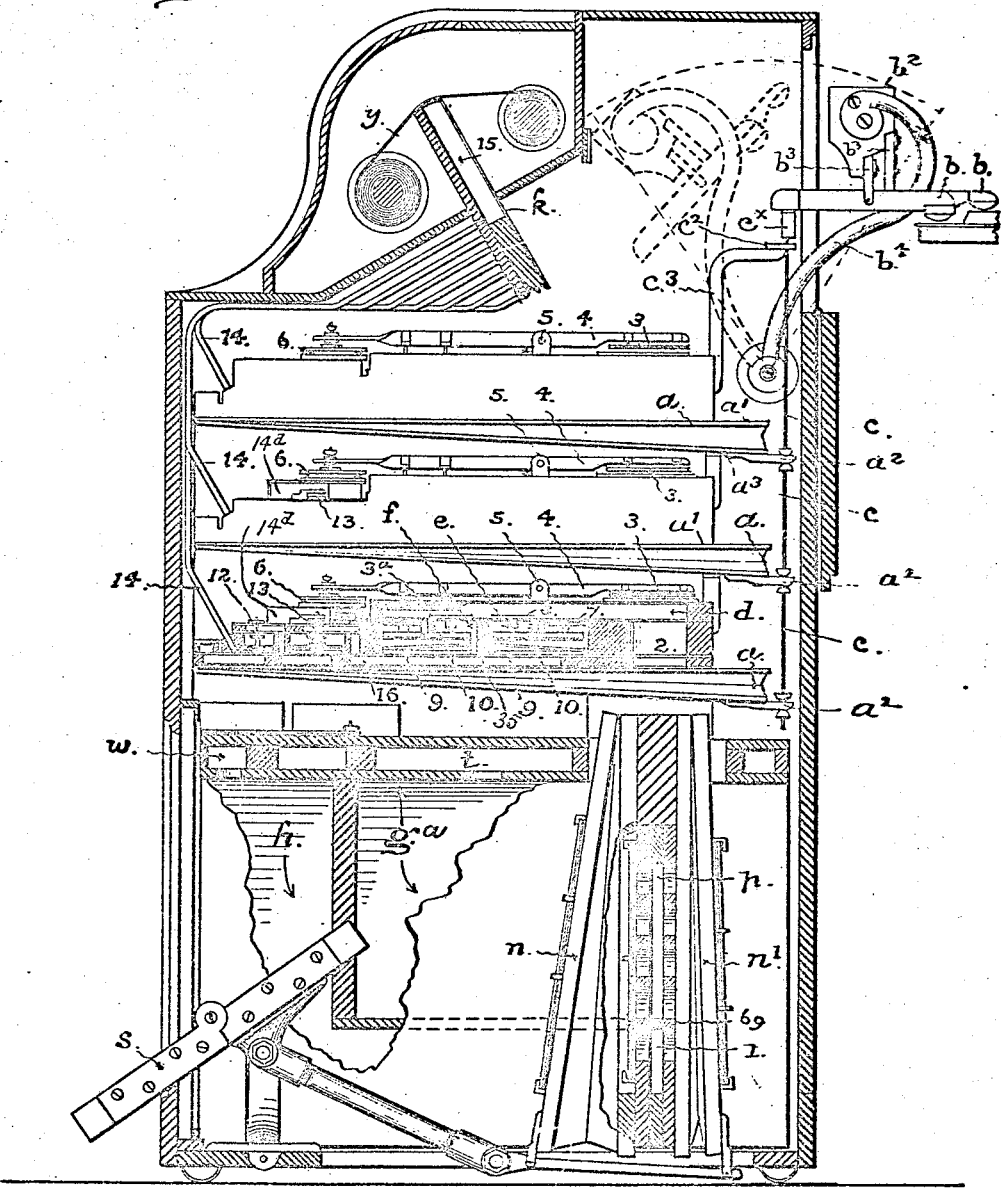

No. 895,235. PATENTED AUG. 4, 1908.
G. P. BRAND.
PNEUMATIC MECHANICAL MUSICAL INSTRUMENT.
APPLICATION FILED DEC. 26, 1902. RENEWED JULY 1, 1908.
6 SHEETS—SHEET 1.

Witnesses.
Arthur S. Lee.
M. Regner.

Inventor:
George P. Brand,
by E. E. Osborn
Atty.

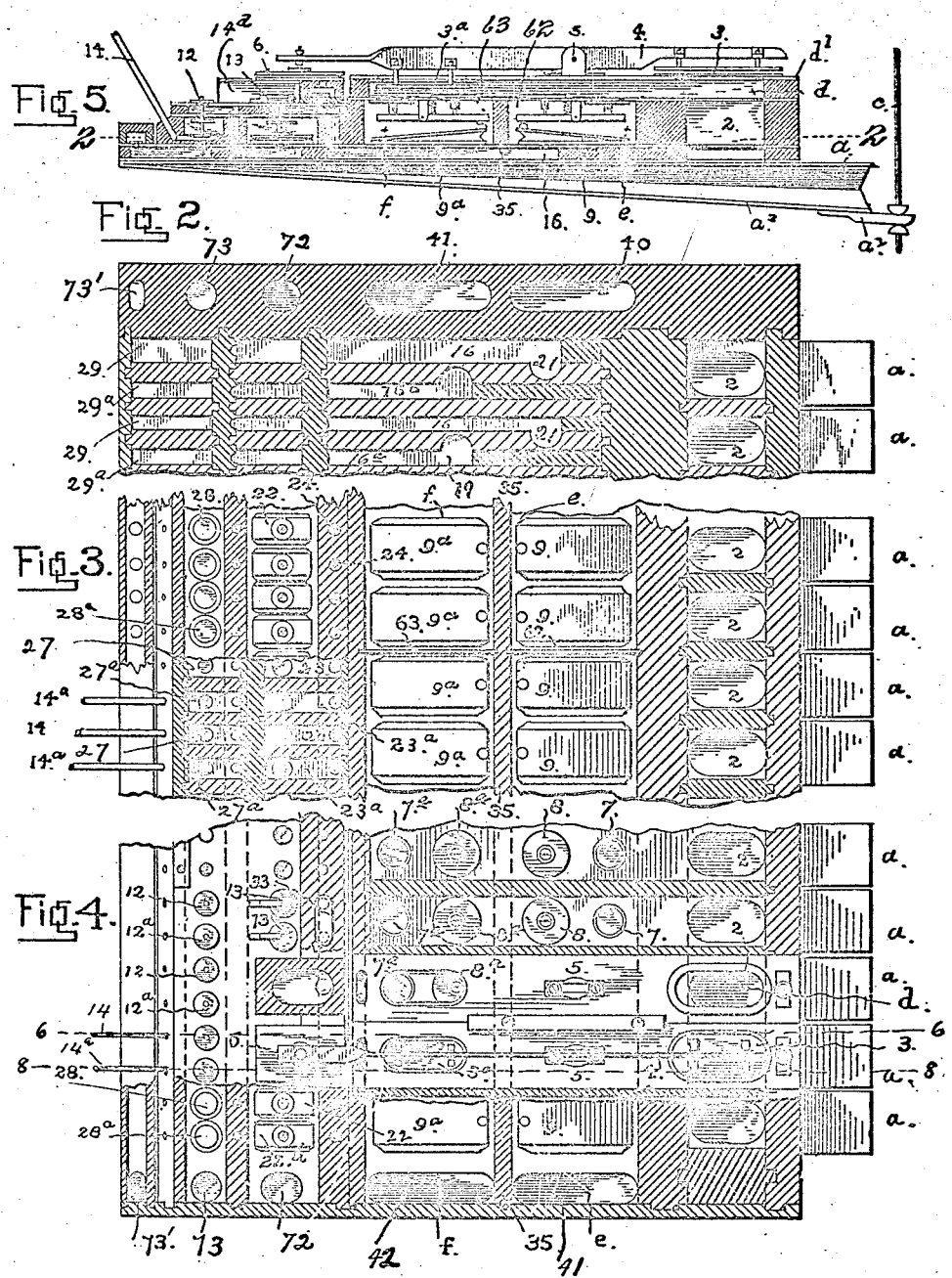

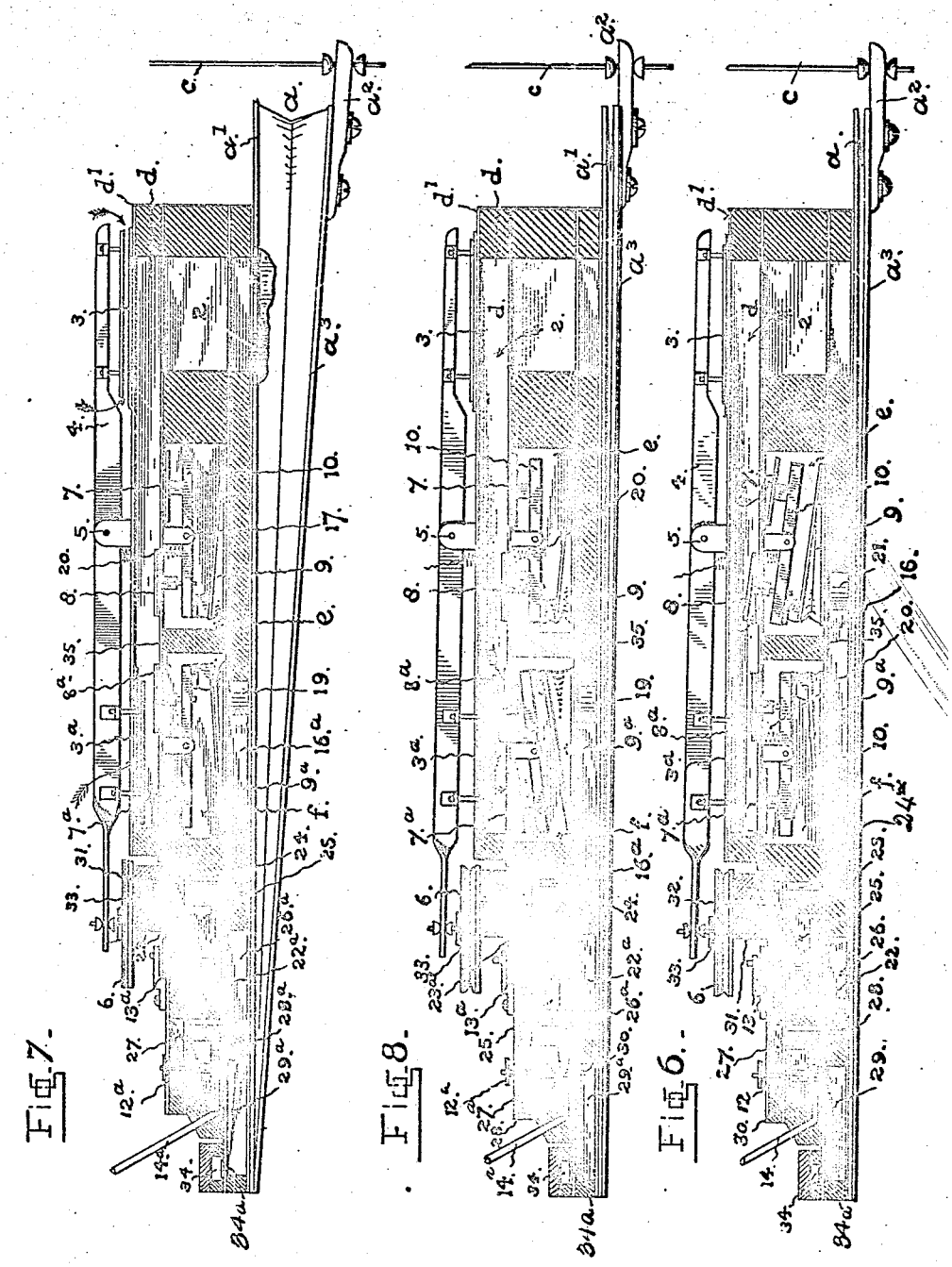

No. 895,235. PATENTED AUG. 4, 1908.
G. P. BRAND.
PNEUMATIC MECHANICAL MUSICAL INSTRUMENT.
APPLICATION FILED DEC. 26, 1902. RENEWED JULY 1, 1908.
6 SHEETS—SHEET 4.
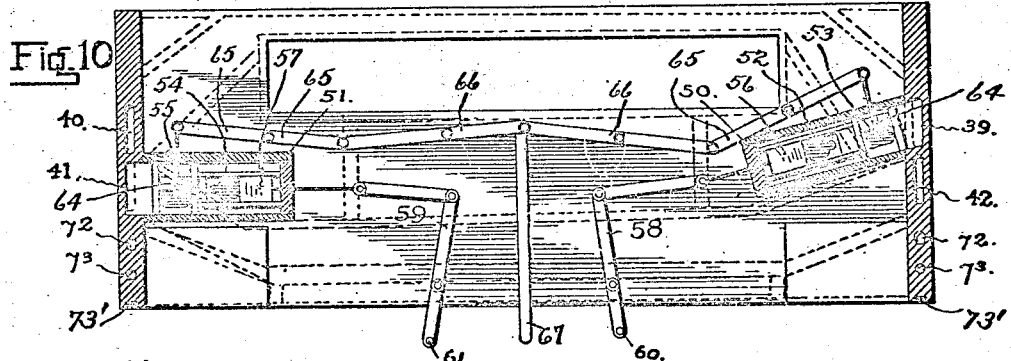
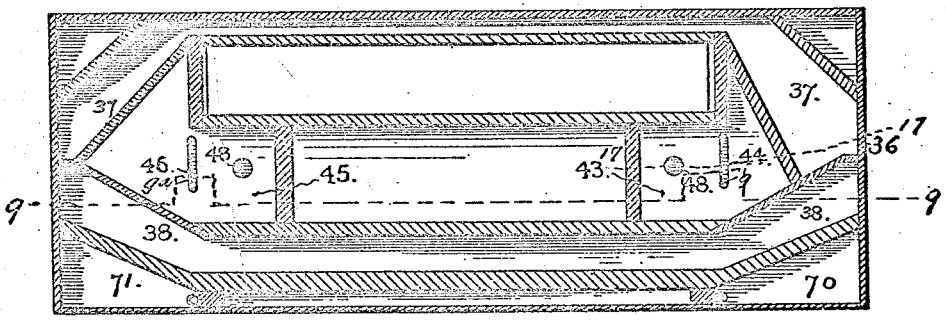
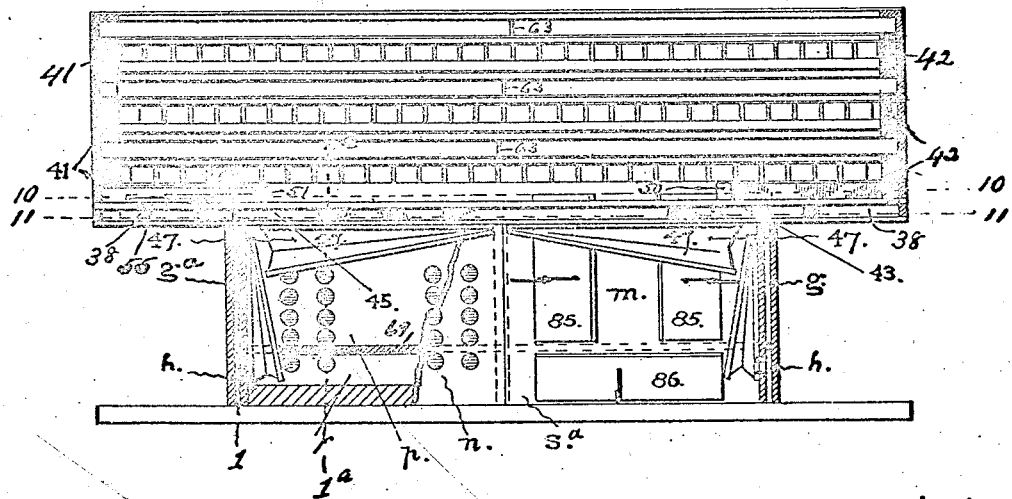

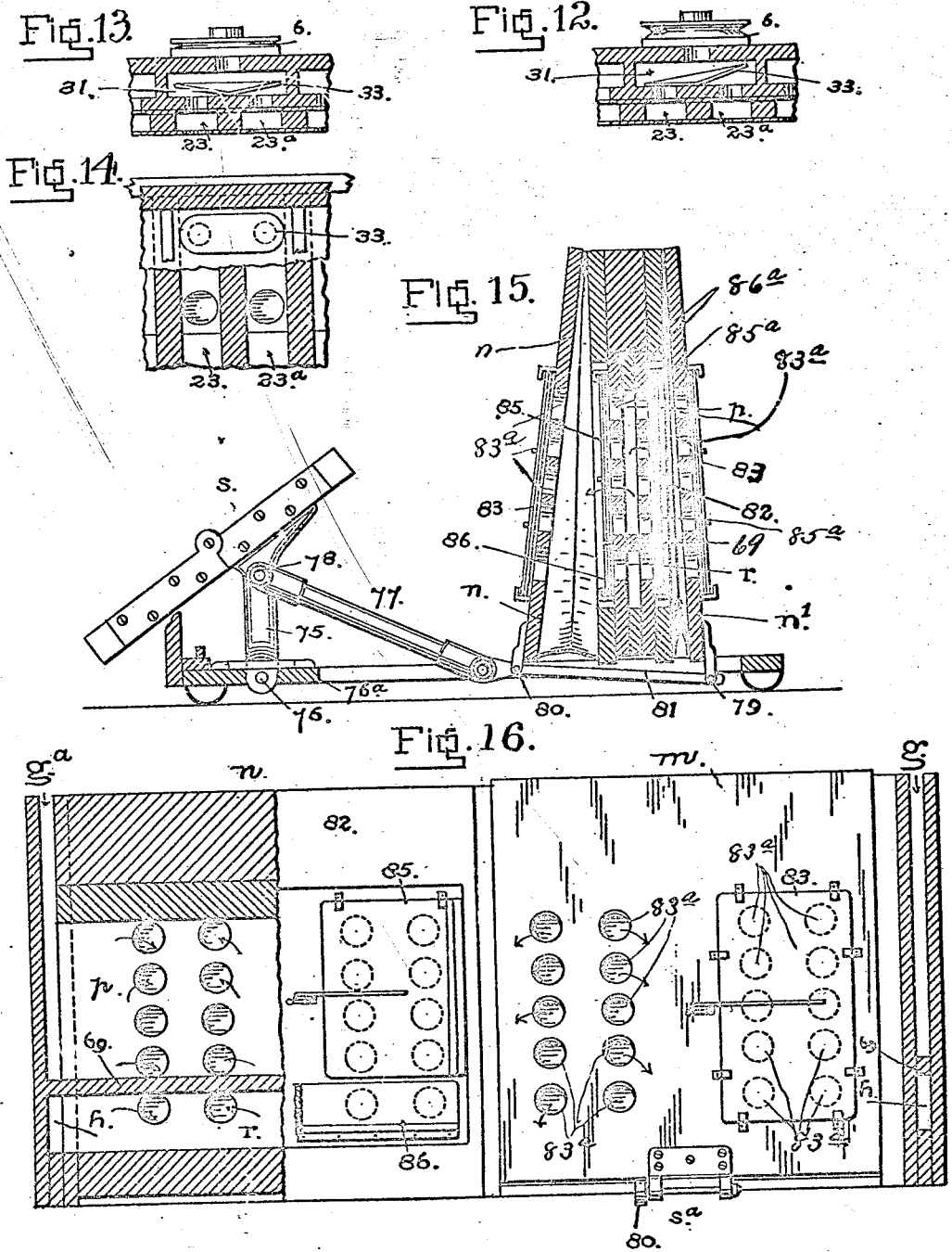

No. 895,235. PATENTED AUG. 4, 1908.
G. P. BRAND.
PNEUMATIC MECHANICAL MUSICAL INSTRUMENT.
APPLICATION FILED DEC. 26, 1902. RENEWED JULY 1, 1908.
6 SHEETS—SHEET 6.
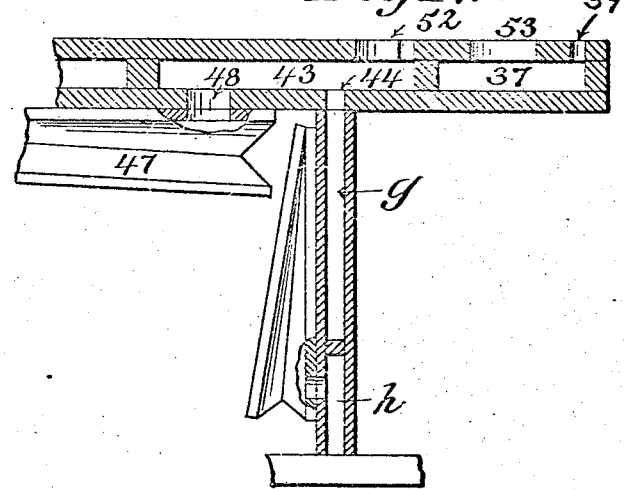
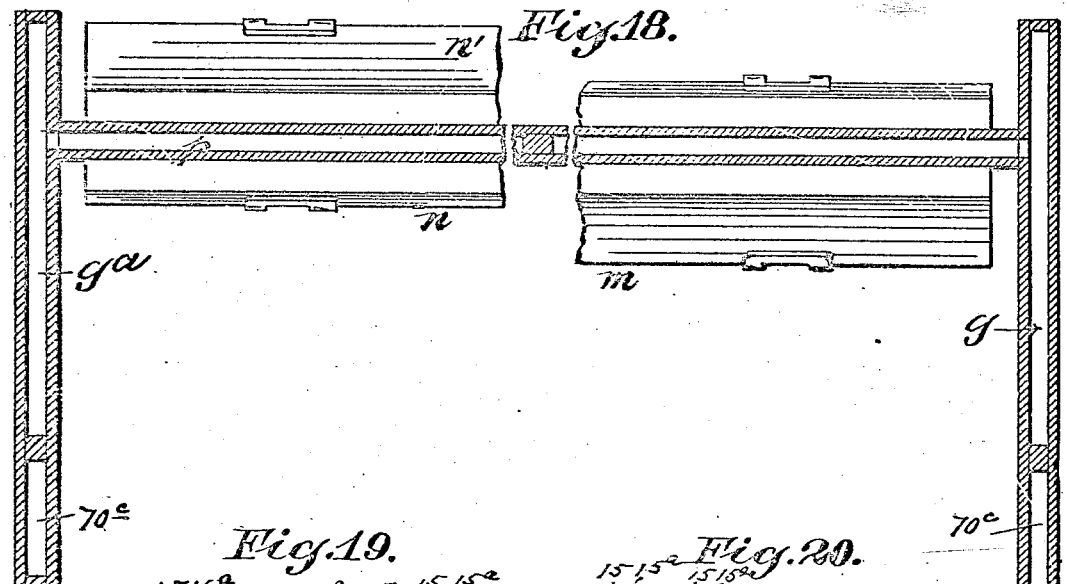
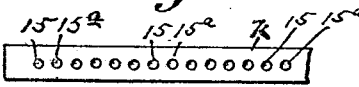
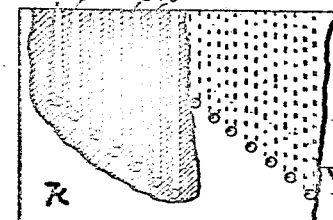

UNITED STATES PATENT OFFICE.

GEORGE P. BRAND, OF SAN FRANCISCO, CALIFORNIA.

PNEUMATIC MECHANICAL MUSICAL INSTRUMENT.

No. 895,235.     Specification of Letters Patent.     Patented Aug. 4, 1908.

Application filed December 26, 1902, Serial No. 136,565. Renewed July 1, 1908. Serial No. 441,370.

*To all whom it may concern:*

Be it known that I, GEORGE P. BRAND, a citizen of the United States, and a resident of the city and county of San Francisco and State of California, have invented new and useful Improvements in Pneumatic Mechanical Musical Instruments, of which the following is a specification.

My invention relates to pneumatically actuated musical instrument players in which two exhaust chambers are used for the purpose of attaining variations in expression, and is designed primarily to give the operator separate and direct control of each exhaust chamber and connections so that each may be used independently of the other throughout the register.

The principle on which my invention is based consists in placing the motive force or agent that operates the power-pneumatics directly under the control of the performer, in such manner that while the tracker-board and note-sheets select and bring into action the power-pneumatics by putting them in communication with the motive force supplied by the mechanism, the performer is able to vary at will the degree or amount of such motive force at or before the instant it is applied to the power-pneumatic, and with such scope of variation that any single note or series of notes wherever located in the register may be given, at the will of the performer different degrees of force or expression above or below others sounded at the same moment.

To such end and object, chiefly, my invention consists in novel construction and combination of pneumatically operated key-actuating devices, two separate exhaust-producing means, sources of pneumatic power each capable of being varied in degree at will, and adapted to supply different degrees of suction or tension separately of each other to operate the key-actuating devices, and with either of which every key-actuating device throughout the register of the instrument is separately and independently connectible, and means controlled by the performer for increasing or diminishing the tension or degree of motive force supplied by one exhausting means separately and independently of the tension supplied by the other. Also, in the combination of separate exhaust chambers and passages capable of supplying different degrees of power one separately of the other to key-actuating devices adapted to be operated by pneumatic power, and means controlled from a tracker-board and a traveling note-sheet throughout the register, in operative communication with either set of exhaust chambers and passages, and means for controlling and varying at will the tension or degree of exhaust in the selected chamber and passage.

The invention also includes certain other features in the construction, arrangement and combination of parts hereafter described and claimed specifically.

In the accompanying drawings, Figure 1, is a sectional elevation taken vertically and transversely of the machine, certain parts being omitted or broken away as on the lines 1—1 and 1ª—1ª of Fig. 9 to more clearly illustrate the invention; Fig. 2, is a horizontal section upon plane of line 2—2— Fig. 5; Figs. 3 and 4, are horizontal sectional views illustrating, with Fig. 2, the valve chests belonging to one set of pneumatics; Fig. 5, is a vertical section taken transversely through the valve chest of one power pneumatic; Figs. 6, 7, and 8, are vertical sectional views, on the lines 6—6 and 8—8 respectively of Fig. 4 on an enlarged scale, of the valve chest of one pneumatic, showing the different positions of the mechanism during the inflating and deflating of the power pneumatic; the sections being taken on different lines and showing different parts, and in Fig. 6. some of the parts being in a different position from what are seen in the other views. Fig. 9 is a view partly in elevation and partly in section, showing the valve chambers and the channel board in which the exhausters are mounted; Fig. 10, is a horizontal section upon plane of line 10—10, Fig. 9; Fig. 11, is a similar view taken upon plane of line 11—11— Fig. 9; Figs. 12 and 13 are vertical sections showing the valve which controls the inflating valve; and Fig. 14, is a horizontal section showing the automatic cut off valve which controls the inflating valve; Fig. 15, is a sectional elevation showing the set of exhausters that are worked by the left pedal; Fig. 16, is a front elevation of one of the exhausters and of portions of the channel boards; Fig. 17, is a vertical section upon an enlarged scale, taken on plane of line 17—17— Fig. 11; Fig. 18, is a horizontal sectional view showing the relation of the exhaust passages to the exhausters; Figs. 19 and 20, are detail views of the tracker board.

The power pneumatic *a* connects through a channel $d$ with two chambers $e, f$, one of which is directly connected through a channel or conducting passage $g$ with a bellows $m$ while the other $f$ is in combination through a separate channel $g^a$ with the second bellows $n$.

Like most of the instruments that have a single tracker board duct to each power-pneumatic the striker $b$, is brought against the key by deflating the power-pneumatic, and after the note is struck the pneumatic is inflated by admitting the atmosphere and simultaneously cutting off communication with the exhaust.

In my present construction the power-pneumatic $a$, is made relatively long and narrow, and as long as the depth of the case will admit, the top board $a'$, being set directly against the bottom of the valve-chest, and the end of the pneumatic extending beyond the valve-chest at the rear, or that side which is nearest to the striker as much as the depth of the case will allow, so as to increase the length of the bellows. To this end the pneumatic striker $b$, is connected by a bar $a^2$, secured to the bottom-board $a^3$, and a rod $c$, extending from the bar to the striker in the usual manner.

All the strikers $b$, are pivotally attached to a rail $b^2$, by stirrups or hangers $b^3$, and the rail is supported outside the case by curved arms $b^4$, which are pivoted at the inner ends to the sides of the case and on these points are arranged to swing in or out of an opening in the back of the case.

The rail $b^2$, is rigidly secured to the outer ends of the arms $b^4$, and is supported by them in both positions, that is when the same parts are turned back within the case, as indicated by the dotted lines in Fig. 1, or when they are set in position over the keys. To provide for moving the strikers in this manner in and out of the case, the rod $c$ connecting each striker with its power-pneumatic is not directly attached to the lever that forms the striker, but its upper end terminates in an enlarged head $c^x$, on which the end of the striker-lever loosely rests when the strikers set in position over the keys; and all the rods $c$, work through apertures in a stationary guide-bar $c^2$ supported by standards $c^3$, that are fastened to the back of the topmost valve-chest. This construction is clearly shown in Fig. 1, in which the whole number of pneumatics required for a register of 85 notes is distributed among three valve chests.

The pneumatics $a$, in one set or row are arranged sufficiently out of vertical line with those above to give proper clearance for connecting rods of the lower chests to pass and work between the power-pneumatics of the upper chest, and allow each striker to be connected as nearly as possible on the longitudinal center-line of its power-pneumatic.

In the particular construction of instrument which I have shown in the drawings the whole number of key-actuating devices and their power-pneumatics for a register of 85 notes are divided for convenience into three sets or groups, arranged one above another, and each having a common chest with two exhaust chambers $e, f$, separated from each other by a division-wall 35 that runs transversely through the chest from one end to the other. All the passages $e$, are connected with one bellows $m$, through the gate box 50, port 52 into chamber 43, port 44 and channel $g$, and all passages $f$, with the other bellows $n$, through the channels $g^a$, as seen in Figs. 1, 9, 10 and 11; so that any tension or degree of exhaust set up in one set of channels and passages can be maintained and also varied either above or below that in the other set of channels by operating one bellows faster or slower than the other. Power to operate the bellows is supplied by the performer in the usual manner by rocking-pedals $s$, arranged side by side; the left-pedal, or "accompaniment pedal" as I have termed it, being shown in Figs. 1 and 9; but the right-pedal, or "melody-pedal", being cut off in Fig. 1 where the section is taken through the instrument between the two pedals. The right pedal is attached at $s^a$ to the right bellows $m$, seen in Figs. 9, 16. Instead of connecting both bellows to the two pedals, or to the same pedal, as heretofore, I connect them separately to the two pedals in such manner that with the right pedal the performer works the bellows $m$ and with the left pedal he works the other bellows $n$. The result of this arrangement is to place the two sources of tension or exhaustion under separate control of the performer enabling him to vary the conditions, or tension, in one set of channels and passages separately and independently of the conditions existing in the other set as well as to produce practically the same condition or degree of tension in both sets of exhaust chambers at the same time, if desired. Being thus under his control, it will be obvious that the performer can increase or diminish at will and with greater or less rapidity the tension or degree of exhaust in either set of passages without affecting or changing the conditions in the other passage, simply by pumping faster with one pedal than with the other. With the bellows $m$, working more rapidly than the bellows $n$, the tension in the passages $e$ will be increased above that existing in the other passages $f$: or the conditions can be instantly reversed and the greater tension can be shifted to the passage $f$ by working the left pedal more rapidly, or the right pedal more slowly.

Any change or variation in the exhausting-power in each set of passages within the capacity of the exhausting-means is produced at the pleasure of the performer, without affecting or changing the conditions in the other set of passages; and these variations are produced and controlled at will from time to time in either or both of the chambers $e, f$, in the valve-chest. With these two chambers, the power-pneumatics $a$, on the same valve-chest communicate through conducting-channels 2 and $d$ and ports controlled by separately operated valves 7—8, herein termed the deflating-valves, which are separately controlled by a set of intermediate valves 12—13, $12^a$ $13^a$ the said valves being also actuated pneumatically and controlled mechanically from the tracker-board $k$ by the perforated note-sheet $y$ through the medium of the tubes 14—$14^a$; the tracker-board channel 15 being connected with the first set 12 of the intermediate valves and the tracker board channel $15^a$ being connected with the other set $12^a$ of the intermediate valves. It will thus be understood that there are two holes 15, $15^a$ in the tracker board for each note.

$14^d$ are couplers for throwing on the upper notes when desired.

The three valve-chests are alike in construction, so that a detailed description of one will answer for the others, it being understood that I do not restrict or limit my invention to the particular number or disposition of the power-pneumatics nor to the arrangement of the exhaust-channels and the controlling valves in the same chest as I have shown herein. As seen clearly in Figs. 19 and 20 the tracker board has two openings for each note.

The chest is divided horizontally into three spaces, or compartments which are herein distinguished for purposes of description, as the bottom space, the middle-space and the top-space. The top and bottom spaces are also divided by vertical partitions extending from front to rear into a separate compartment for every power-pneumatic in the chest, and with the topmost passage $d$ the power-pneumatic is always in communication through a vertical passage 2, at the bottom of which is an opening in the top-board $a'$ of the pneumatic.

In the top-plate $d'$ that covers the passage $d$ are two apertures opening to the atmosphere and through which atmospheric pressure is admitted to inflate the power-pneumatic $a$. The valves 3—$3^a$ controlling these apertures and herein termed inflating-valves, are actuated to cover and uncover the inlets by a lever 4 of the first order fulcrumed in a slotted block 5 on the top of the chest and connected at the forward end to a motor-pneumatic 6 mounted on the top of the chest. The valve disks 3 and $3^a$ are attached to the lever on opposite sides of its fulcrum 5, and as one valve seats downwardly on the opening from above, the other acts in a contrary direction; but both valves are opened or closed by a single movement of the lever 4. A double valve of this construction will give an opening of large area with a relatively small throw or movement of the lever, and it has an advantage over a single valve of a proper size to control an inlet of equal area, in opening and in closing with a shorter and a more rapid throw of the lever.

The exhaust-chambers $e$, $f$, communicate with the same compartment $d$ through two ports in the top-board of each passage, controlled by a double valve composed of two valve-disks connected to the ends of a common rocking-lever 10. A motor-pneumatic located in the passage beneath one end of the lever 10, opens the valves when it is inflated. The valves 7—8 belonging to the chamber $e$, uncover the two ports when the pneumatic is inflated, and close them when the pneumatic is exhausted of air; in the latter movement the lever 10 is thrown or caused to follow the movement of the top-board of the pneumatic by the reaction of a coiled spring 20 placed between the lever and the top board of the passage. The second set of valves $7^a$, $8^a$ are operated in the same manner by the pneumatic $9^a$ in the chamber $f$.

The pneumatic 9 in the chamber $e$ is fixed over an aperture 21, from which a channel 16 on the bottom of the chest extends forward through the passages 23 $24^a$ to the intermediate valve 13, while the pneumatic $9^a$ actuating the valves of the other exhaust chamber $f$, is connected through a separate aperture 19 and channels $16^a$ with the compartment $23^a$ of a second intermediate valve $13^a$.

24 is a passage affording communication between the channels $16^a$ and the compartment $23^a$, as seen clearly in Fig. 8.

In the foregoing description of the power-pneumatics and their inflating-valves 3 and $3^a$, it will be seen that the said inflating-valves are actuated simultaneously with the inflating valve to cut off the atmosphere when either of the deflating valves is opened, and again to admit the atmosphere to the passages $d$ and 2, as soon as the deflating-valve is seated. These movements of the inflating-valve are effected by the pneumatic 6, which being inflated as the atmosphere is admitted to the compartment 31 through either the channel 23 or $23^a$, according as the valve 13, or the valve $13^a$, may be lifted, will act to close the inflating-valve; or when the passage 23 (or $23^a$) is closed to the atmosphere and opened to the exhaust-passage 25, which is common to all the sets of valves 13 and $13^a$ in the valve-chest, the pneumatic 6 will collapse and open the passage $d$, to the atmosphere. The two ports that open from the separate passages 23—$23^a$ into the compartment 31 are controlled by a rocking-valve 33, formed of a flap that operates to cover one port when the other port is in service and thereby prevent the air that may be passing into the compartment 31 through one port from passing back through the other passage instead of inflating the motor pneumatic 6. A controlling valve of some kind is necessary at these ports for the reason that the compartment 31 is common to the passages 23, 23$^a$ of the two intermediate valves 13, 13$^a$ belonging to the same power-pneumatic.

The two intermediate valves 13, 13$^a$ separately control the communication of their respective pneumatics 9, 9$^a$ with the atmosphere, or with an exhaust compartment 25. As the two valves 13, 13$^a$ are identical in construction and operation the following description of one will answer for the other; The valve 13 has two valve-disks fast on a common stem, the lower end of which rests on a motor-pneumatic 22 inclosed in the exhaust compartment 25 but communicating with a channel 26 in the bottom of the chest. The upper disk of the valve 13 seats upon an inlet-port in the top of the chest, and through that opening atmospheric pressure is admitted to the channels 23 and 16 to inflate the primary pneumatic 9 of the deflating-valve, when the valve 13 is lifted. Acting from the opposite direction the lower disk of the valve 13 closes a port in the bottom of the channel 23, and shuts off communication with the exhaust-compartment 25 when the valve is lifted; or, by contrary movement, the valve closes the channel 23 to the atmosphere and opens it to the exhaust 25. These movements of the valve 13 are effected pneumatically from the tracker-board and the traveling note-sheet, through a primary valve 12 operated by a diaphragm pneumatic 28, the arrangement and operation of which are too well known to require a detailed description.

In the present construction the motor-pneumatic 22 operating the intermediate-valve 13 is inflated and deflated through the action of one primary-valve 12, the operating diaphragm 28 of which is inflated when the tracker-board duct to which it is connected by the conductor 14 is uncovered by the note-sheet, and it is in a state of collapse at all other times by being connected with an exhaust-channel 34 through a passage 29 in the lower part of the valve-chest. The valve 12 has two disks fast on a single stem, the upper disk controlling a port in the top-board of a channel 27 with which the compartment 26 under the pneumatic 22 of the principal valve 13 is always in communication; while the remaining disk of the first mentioned valve controls a port in the floor of the channel 27, and through which the channel communicates with an exhaust-compartment 30, as often as the valve 12 is operated to close the channel 27 to the atmosphere.

The valves 12 and 13 stand normally away from the exhaust ports and close the atmosphere-inlets, and consequently the pneumatics 9 and 22 are cut off from the atmosphere and are connected with their respective exhausting-compartments 25—30, and will remain collapsed until the secondary-valve 12 is actuated by exhausting the air from beneath its operating diaphragm, and the channels 23 and 27 are thereby opened to the atmosphere.

Every power pneumatic $a$, is thus supplied with air through the ports controlled by the inflating valve 3—3$^a$ and is put in communication with one or the other of the exhaust chambers $e, f$, according as the valve 7—8— or the valve 7$^a$—8$^a$ is opened by inflating the pneumatic 9, as seen in Fig. 6, or the other pneumatic 9$^a$, as seen in Fig. 8. In the one case, the power-pneumatic $a$ will be deflated with a rapidity of motion proportionate to the tension in the chamber $e$, which I term the "melody-side", and in the other case the same power-pneumatic will be deflated from the chamber $f$, which I term the "accompaniment-side" of the chest. Every power-pneumatic in the chest has one inflating-valve, or set of inflating valves; but is provided with two deflating-valves or sets of deflating valves; and while the inflating-valve is operated by a single pneumatic motor 6 as before described, the deflating valves 7 and 8 or 7$^a$ and 8$^a$ are separately and independently operated from the tracker-board through two tubular conductors 14 and 14$^a$, one connecting a pocket under the diaphragm 28 with a duct 15 in the tracker-board and the other conductor 14$^a$ connecting a second duct,—not shown,—in the tracker-board, with the pocket under the diaphragm 28$^a$ of the other valve. The atmosphere admitted through the tracker-board duct inflates the diaphragm 28 as often as the duct is uncovered by the note-sheet, and by raising the valve 12 from its seat on the upper port the atmosphere is admitted to the channels 27—26, which acting in like manner on the pneumatic 22 of the intermediate valve 13 admits the atmosphere to the channel 23 to operate the motor 9 of the deflating-valve. The diaphragms 28—28$^a$ of the two sets of secondary valves 12, 12$^a$ belonging to every power-pneumatic are always in communication with the suction-box 34 through a channel 29 29$^a$ under the diaphragm and a bleed-hole 34$^a$ in the bottom of the suction-box. Through this connection the pocket under the diaphragm is exhausted of air and remains normally deflated until the air is admitted to it through the tracker-board duct. Every power-pneumatic $a$, in this instrument is thus connectible with either one of the variable-exhaust chambers $e, f$, through separate ports and channels, each controlled through a separate duct in the tracker-board in the usual manner; but while the proper valve is selected and put in operation to connect the power-pneumatic with one passage $e$, or the other passage $f$, by the traveling note-sheet, the tension or degree of exhaust supplied through such selected passage is regulated and varied directly by the performer through the control given by the bellows action.

The construction and arrangement of this part of the invention will be clearly understood by referring to the details Figs. 15 and 16 where the bellows $m$, being connected with the right pedal, and the bellows $n$ with the left pedal, can be worked separately with varying rates of motion by the performer, according to the tension which he may desire to produce in the two sets of pneumatic-passages.

The channel-board 36, which extends the entire width of the case under the lowest valve-chest, is divided by partitions running generally longitudinally, into a channel 37 for the "melody-side", and a channel 38 for the "accompaniment side", of the valve-chest. Passages 39—40 running vertically upward in the sides of the case connect the chambers $e$ in all the valve-chests with the channel 37, and similar upright passages 41—42 from the ends of the other channel 38 connect the remaining exhaust chambers $f$, with that channel. Between these two channels a compartment 43 over one bellows $m$, communicates with that bellows through the passage $g$ and port 44 seen in Figs. 9 and 11, at one end of the channel-board, and with a second and similar compartment 45 at the other side of the chest the bellows $n$ is connected by a passage $g^a$ and port 46. Under each of the compartments last mentioned is an equalizing bellows 47 communicating with its compartment above through an aperture 48 in the floor of the channel-board. This bellows has the function of the well-known exhauster and to that end it is expanded in the usual manner by springs or weights against the exhausting-force or suction of the bellows, so as to maintain a constant pull on the exhaust compartment and thereby tend to overcome irregularity in the power operating the bellows and insure an even tension. With these two compartments 43—45 the channels 37—38 communicate independently of each other through two valve boxes 50—51 situated on the top of the channel-board and having slide-valves under the control of the performer at the front of the instrument. Each valve-box having two apertures on the bottom seen at 52—53 in the valve-box 50, and at 54—55 in the other valve-box 51, the apertures 52 and 54 open into the compartment that communicates with the bellows; but the other apertures 53—55 open into the channels 37 and 38. The valve-box 50 on the right side of the channel-board being located over the bellows $m$, controls the communication between the compartment 43 and the melody-channel 37. The arrangement at the opposite side of the channel-board is the same, and the accompaniment-channel 38 communicates with the compartment 45 over the bellows $n$, through the aperture 46. The bellows operated by the right-pedal thus produces an exhausted condition in the compartment 43, the channel 37 and in all the exhaust chambers $e$ that connect therewith through the trunks or passages at the sides of the case. And in like manner the other bellows operated by the left-pedal produces a similar condition throughout the compartment 45, the channel 38 and the exhaust chambers $f$, in the valve-chest independently of the first mentioned bellows.

The pneumatic conditions in the two sets of exhaust boxes or chambers $e$, $f$, with which the power-pneumatics are connectible are also by this means made variable at the will of the performer; and he is enabled to produce the same degree of tension in both sets of passages at the same time, or to increase and vary the degree of tension in either one, without affecting or changing the conditions in the other set of passages. He is able, also, to increase the tension in one, and simultaneously reduce it in the other set of passages.

Slides 56—57 in the valve boxes cover and uncover the apertures 52—54 and are connected with levers 58—59 that have handles 60—61 projecting at the front of the case as a means of increasing or reducing at will the area of the apertures. By partially closing or "choking" the aperture through which the channel 37— or 38 communicates with the exhaust passage below and working the bellows with greater speed, the performer produces a sharp and heavy action of the particular power-pneumatic connected with the power at that moment by simply throwing the slide full open.

It will be noticed in the construction shown in Fig. 5 that the melody-chamber $e$ and the accompaniment chamber $f$ in every valve-chest, although running entirely through the register of the instrument, are both divided by cross-partitions 62—63 (shown in Fig. 3) at the middle, and that the divisions or sections of each passage are connected at the outer ends of the valve-chest with the channel or space in the channel-board below to which the passage belongs. The object of dividing the exhausting-passages and the controlling valves of the power-pneumatics in this manner instead of having the exhaust chambers $e$, $f$, extend through the chest from end to end, is to allow the instrument to play music written for the pianola and piano players of that description in which the tracker-board is provided with but one duct for every note in the register. And for that purpose each valve-box is provided with a slide 64 to cover the aperture that opens into the channel beneath it, and the two slides are connected by a system of levers 65, 66 to a common-draw-stop 67.

Closing the apertures 53—55 in the valve-boxes at the same time, which is done by drawing the stop 67, has the effect to cut off the channels 40—42 from the exhaust-compartments 43—45 and connect the two compartments in a direct manner through the valve-boxes 50, 51, with the upright passages 39—41 at the right and left ends respectively and thus connect the right section of the chamber $e$ with the bellows $m$, and the left section of the chamber $f$ with the bellows $n$. The power supplied from the bellows $m$ will thus operate all the power-pneumatics that are connected with the section of the chamber $e$ on the right of the cross-partition 62, while the power from the other bellows $n$ will supply all the power-pneumatics connected in the section which is situated on the left side of the cross-partitions 63 in the chamber $f$. By this means the two sets of deflating valves in each valve-chest are divided between the two sources of power so that the bellows $m$ will control the power to operate the upper notes, and the bellows $n$, the lower notes, while the second set of deflating-valves in each row situated respectively in the section to the left of the partition 62 in the passage $e$, and to the right of the partition 63 in the passage $f$ will be cut off from the power for the time being. The power to operate the intermediate valves 13 and $13^a$ is also supplied from the same bellows-action; but as the best results will be obtained in the operation of this part of the mechanism when the power to work the intermediate valves is maintained as nearly as possible at a uniform tension, I have provided separate exhaust chambers and exhausters for these valves, and have divided the exhaust chests horizontally by partitions 69 into upper compartments $p$, with which the trunks or passages $g$, $g^a$ communicate, and lower compartments $r$, from which a separate trunk or passage $70^c$ at each side of the case leads upward to compartments 70—71 in the channel-board. With these last-mentioned spaces the exhaust-passages or channels 25—30 and 34 are connected through the upright passages or channels 72—73 73' at the ends of the valve-chests. By this means the lower sections $r$ of the exhaust chests are given a more even condition of tension than would be obtained if the intermediate valves were connected directly with the main source of exhaust or suction that is necessarily undergoing continual fluctuations and variations in tension.

The construction of the bellows-action will be more clearly understood by referring to the details, Figs. 15 and 16, in which the bellows for the left, or "accompaniment" side of the instrument is seen in section in Fig. 15 and the bellows both for the left and the right side are seen in elevation in Fig. 16 without the pedals.

The construction of the bellows-action for the left or "accompaniment" side is the duplicate of those for the right, or "melody" side, the description of one will answer for the other.

The two bellows $n$, $n'$, are arranged for operation on opposite sides of a connecting conductor-board, and are so connected to the same pedal that one bellows is expanded and the other is collapsed in every throw or movement of the pedal. The movable front board of each bellows is hinged at the top in the usual way to the stationary back-board, which may form one side or wall of the conductor-board, and the movable boards are connected at the bottom to the pedal by a connecting-rod 77 and a bar 81 pivoted at 79 and 80, see Fig. 15. The pedal is fixed at an angle from the vertical, inclining backward upon the upper end of a rocking bar or standard 75 the lower end of which is provided with a bearing or pivotal point 76 in a baseplate $76^a$ and on this point the pedal is arranged to move in an arc under the alternate thrust and pressure exerted alternately by the toe and the heel of the foot.

The apertures $83^a$ in each movable board are covered by the usual flaps 83 that open as the bellows is collapsed, to expel the air, and close upon the apertures each time the bellows is expanded.

The apertures $85^a$ in the stationary boards $86^a$ registering with apertures of the same size in the conductor-board are controlled in the same manner by other flaps 85 excepting that the lower set of apertures in both sides are situated below the partitions 69 in the conductor-board are covered by a separate flap 86 on each side. This is the construction followed when the channel in the conductor-board is divided into separate passages to connect separately with different sets of exhaust-conducting passages $g$, $h$, one for the power-pneumatics, and the other to actuate the pneumatics of the intermediate valves as before described. The bellows being separately connected in this manner to the right and left pedals are each double-acting, that is one side is drawing on the conductor-board channels as the other is being collapsed to expel the air in both the forward and the return throw of the pedal $s$, the effect of which is to obtain a powerful exhausting action from a relatively slow motion of the pedal, and also a quick and delicate response and change in the degree of tension or exhaust force in the connecting passages between the conductor-board and the exhaust-compartments in the valve-chests above to the movements of the pedals. The conditions in the two sets of compartments and passages are thus brought under the control of the performer to such an extent or degree that the tension existing in all those which are connected with the same set of bellows can be varied instantly in a higher or lower degree with respect to the conditions obtaining in the other set of passages by one or more throws of the pedal or by working one pedal more rapidly than the other.

The instrument is to be provided with the necessary motor to move the perforated note-sheet, and with the usual means and devices for regulating and varying the speed of the sheet to change the tempo of the piece being played: but as these attachments are already in use and their construction well known, no detailed description or illustration of such parts is considered necessary to a clear understanding of my present invention.

The parts and mechanism being thus constructed and combined the operation of the instrument is as follows:—The performer seated in front of the instrument sets up a condition of exhaust in all the passages and compartments that are connected with the two sets of bellows $m$ and $n$, by working the right and left pedals. All the ducts in the tracker-board being covered by the note-sheet at that time, the diaphragms 28—28$^a$ of each set of valves 12 and 12$^a$ remain in a state of collapse, and the pneumatics 22 and 22$^a$ of each set of valves 13 and 13$^a$ are consequently deflated; so that the two passages 23, 23$^a$ leading to the compartment 31 are open to the exhaust or suction in the common passage or channel 25—and the pneumatic 6 is collapsed. Now if the duct communicating with the conductor 14 be uncovered, the atmosphere is admitted under the diaphragm 28; or if the other conductor 14$^a$ of the mechanism belong to the same power-pneumatic be opened to the atmosphere by uncovering the duct to which that conductor is connected, the diaphragm 28$^a$ of the other valve 12$^a$ will be inflated. In the one case it will be evident that the deflating valve 7—8 will be operated and the power-pneumatic will be connected with the exhaust produced by the right bellows $m$ through the melody-side of the valve-chest; while in the other case, the valve 7$^a$ 8$^a$ will put the same power-pneumatic in communication with the exhaust as supplied from the left-bellows $n$ through the accompaniment-side of the chest. The note-sheet therefore operates to select and place any note in action according to its location in the composition, whether in the air or the harmony, while the performer by his control of the pneumatic power through the pedals varies the tension in either or both sets of passages according to the requirements of the piece.

Variations in the force and expression of notes and passages contained in the accompaniment as well as in the melody of the piece are produced at will by working the one pedal faster or slower than the other; or the same tension may be produced at will in both sets of passages where the composition calls for increased power as in playing runs, chords and passages where a considerable number of notes are struck at the same moment.

Having thus fully described my invention what I claim as new herein and desire to secure by Letters Patent is,

1. The combination with a striker for musical instruments of a power-pneumatic operating the striker, two separate exhaust-chambers, valve-mechanisms separately controlling the communication between the power-pneumatic and each exhaust-chamber, pneumatically-operated means for selecting and actuating either of said valve-mechanisms to put the power-pneumatic in communication with one or the other of said exhaust-chambers, and means for varying at will the tension in either exhaust-chamber above or below that in the other exhaust-chamber.

2. The combination with a striker for musical instruments of a power pneumatic operating the striker, two separate exhaust chambers, valve mechanisms separately controlling communication between the power-pneumatic and each exhaust chamber, pneumatically operated means for selecting and actuating either of said valve mechanisms to put the power-pneumatic in communication with one or the other of said exhaust chambers, and exhaust means for varying at will the tension in either of said exhaust chambers above or below that in the other exhaust-chamber.

3. The combination with a striker for musical instruments, of a power-pneumatic for operating the striker, two separate exhaust chambers, valve mechanisms arranged to separately control communication between the power-pneumatic and each of said exhaust chambers, means in each of said chambers for operating said valves and a tracker board and note sheet for controlling said valve mechanisms.

4. The combination with a striker for musical instruments, of a power-pneumatic for operating the striker, two separate exhaust chambers, valve mechanisms arranged to separately control communication between the power-pneumatic and each of said exhaust chambers, a tracker board and an independent set of valve mechanisms and means in each of said chambers for operating said valves controlled by said tracker board and a note sheet for operating said valve mechanisms.

5. The combination with a striker for musical instruments, of a power-pneumatic operating the striker, two separate exhaust chambers, valve mechanisms separately and independently controlling communication between the power pneumatic and each exhaust chamber, pneumatically operated means for selecting and actuating either of said valve mechanisms independent of the other to deflate the power pneumatic by putting it in communication with one or the other of said exhaust passages, whereby the power-pneumatic may be independently operated by either exhaust chamber or by both simultaneously.

6. The combination with a striker for musical instruments, of a power-pneumatic operating the striker, two separate exhaust chambers, valve-mechanisms separately and independently controlling communication between the power pneumatic and each exhaust chamber, pneumatically operated means for selecting and actuating either of said valve mechanisms independent of the other to deflate the power-pneumatic by putting it in communication with one or the other of said exhaust passages, and means in addition to the deflating mechanism for automatically inflating the power-pneumatic after the latter is cut off from the exhaust, whereby the power-pneumatic may be independently operated by either exhaust chamber or by both simultaneously.

7. The combination with pneumatically operated key-actuating devices, of a tracker board two separate exhaust-chambers, valve-mechanisms controlled through said tracker-board and a note-sheet for selecting and putting the key-actuating device of any note throughout the register in communication with one exhaust chamber and the key-actuating device of any other note throughout the register in communication with the other exhaust chamber, and separate means independently controlled by the performer for increasing or diminishing the tension in either exhaust chamber without affecting the tension in the other exhaust chamber, whereby the performer is enabled to accentuate by means of either exhaust chamber.

8. The combination with a series of key-strikers for a mechanical musical instrument, including a power-pneumatic to each striker operating by alternate deflations and inflations to actuate the strikers, of two separate exhaust chambers, valve mechanisms separately controlling communication between every power-pneumatic and said exhaust chambers, a set of selecting valves operating to connect any power-pneumatic in the series with either one of said exhaust chambers, and pedal operated means for separately and independently varying the tension in either exhaust chamber at will above or below the tension existing in the other exhaust chamber, whereby the performer is enabled to accentuate by means of either exhaust chamber.

9. In a mechanical musical instrument a series of key-actuating devices each operating independently of all the others, and each including a power-pneumatic, of two separate deflating means variable as to tension, deflating valve mechanisms separately controlling the communication of the power-pneumatics with either of said deflating means, inflating valves controlling the communication of the power-pneumatics with the atmosphere, a tracker board means controlled by said tracker-board and a traveling note-sheet for selecting and operating one or the other of said deflating means, and pneumatically-actuated means controlled by both deflating valve mechanisms for opening or closing the inflating valves, in time with the movements of either deflating valve mechanism.

10. In a mechanical musical instrument, pneumatically operated key-actuating devices, two separate exhaust-chambers, a bellows to each exhaust chamber, and means for exhausting and controlling each bellows independently of the other so that the tension in one exhaust chamber can be increased or diminished without affecting the tension in the other exhaust chamber.

11. The combination with a series of pneumatically-actuated devices each adapted to operate a single sound-producing mechanism in a musical instrument and including a power-pneumatic operating the said device by variations in air-pressure, of two separate exhaust chambers, valves separately controlling the communication between each exhaust-chamber and each of said power pneumatics, and separate means independently controlled by the performer for increasing or diminishing the tension in either exhaust chamber without affecting the tension in the other exhaust chamber, whereby the performer is enabled to accentuate by means of either exhaust chamber.

12. In a mechanical musical instrument, the combination with key-actuating devices including power-pneumatics individual thereto, of a valve-chest having two separate exhaust chambers, a separate channel to every power-pneumatic communicating with the atmosphere through a valve-controlled opening, apertures through which it communicates separately with the said exhaust chambers, deflating valves controlling the said apertures of communication, a tracker board means operated pneumatically through said tracker-board and traveling note-sheet for selecting and operating either one of the said deflating valves, and means simultaneously operating the valve that controls communication of the common-channel with the atmosphere.

13. In a mechanical musical instrument, the combination with key-actuating devices including power-pneumatics individual thereto, of a valve-chest having two separate exhaust chambers, a separate channel to every power-pneumatic communicating with the atmosphere through a valve-controlled opening, apertures through which it communicates separately with the said exhaust-chambers, deflating valves controlling the said apertures of communication, a tracker board means operated pneumatically through said tracker-board and traveling note-sheet for selecting and operating either one of the said deflating valves, and means simultaneously operating the valve that controls communication of the common-channel with the atmosphere, said means operating to open or close the channel to the atmosphere when either of the deflating valves is actuated.

14. In a mechanical musical instrument, the combination of power-pneumatics and key-actuating devices, of two separate exhaust chambers, including valves separately controlling the communication of each power-pneumatic with the said exhaust chambers, and separate means independently controlled by the performer for increasing or diminishing the tension in either exhaust chamber without affecting the tension in the other exhaust chamber, whereby the performer is enabled to accentuate by means of either exhaust chamber.

15. A valve-chest for power-pneumatics having a plurality of channels each individual to a power-pneumatic, two separate exhaust chambers, a deflating-valve to each exhaust chamber, separately controlling the communication of the power pneumatic with the corresponding exhaust-chamber, pneumatically actuated means for separately operating the deflating valves, intermediate valves controlling said valve-operating means, an inflating-valve to each power-pneumatic, means for selecting and operating said deflating valves and also operating the inflating valve.

16. A valve-chest for power pneumatics having a plurality of channels each individual to a power-pneumatic, two separate exhaust-chambers, a deflating valve to each exhaust chamber, separately controlling the communication of the power-pneumatic with the corresponding exhaust chamber, pneumatically actuated means for separately operating the deflating-valves, intermediate valves controlling said valve-operating means, an inflating-valve to each power-pneumatic, means for selecting and operating said deflating valves, and also operating the inflating-valve, and means for increasing or reducing the degree of tension in either exhaust chamber either above or below the conditions existing in the other exhaust chamber.

17. A valve-chest for power-pneumatics having two separate exhaust-chambers, two deflating-valves to every power-pneumatic separately controlling the communication of the pneumatic with the exhaust chambers, an inflating-valve to each power-pneumatic, a tracker board means controlled by said tracker-board and a note-sheet operating to select and actuate either of the deflating-valves, means operating the inflating valve to open or close the same in time with the actuation of the selected deflating-valve, two sources of tension or exhaust separately connected with the two exhaust chambers, and separate means independently controlled by the performer for increasing or diminishing the tension in either exhaust chamber without affecting the tension in the other exhaust chamber, whereby the performer is enabled to accentuate by means of either exhaust chamber.

18. In a pneumatically-actuated musical instrument having a plurality of power-pneumatics and sound-producing devices operated thereby for a register of notes, a melody-channel, an accompaniment-channel, passages separately and individually connecting all the power-pneumatics throughout the register with the said channels, a valve controlling communication between each power-pneumatic and the melody-channel, a second valve separately controlling communication between each power-pneumatic and the accompaniment-channel, pneumatically controlled selecting and actuating devices to each valve, an exhaust-bellows to each channel and means for operating one bellows separately of the other and at varying rates of speed to produce in the melody-channel varying conditions either above or below the conditions in the accompaniment channel.

19. In a pneumatically-actuated musical instrument having a plurality of power-pneumatics and sound-producing devices operated thereby for a register of notes, a channel-board containing a melody-channel, and an accompaniment-channel, passages separately and individually connecting all the power-pneumatics throughout the register with the said channels, a valve controlling communication between each power-pneumatic and the melody-channel, a second valve separately controlling communication between each power-pneumatic and the accompaniment-channel, pneumatically controlled selecting and actuating devices to each valve, an exhaust-bellows to each channel and means for operating one bellows separately of the other and at varying rates of speed to produce in the melody-channel varying conditions of tension either above or below the conditions in the accompaniment-channel.

20. In a pneumatically-actuated musical instrument having a plurality of power-pneumatics and sound producing devices operated thereby for a register of notes, a melody-channel, an accompaniment-channel, passages separately and individually connecting all the power-pneumatics throughout the register with the said channels, an inflating-valve to each power-pneumatic, a valve controlling communication between each power-pneumatic and the melody channel, a second valve separately controlling communication between each power-pneumatic and the accompaniment-channel, pneumatically controlled selecting and actuating devices to each valve, an exhaust-bellows to each channel and means for operating one bellows separately of the other at varying rates of speed to produce in the melody-channel varying conditions of tension either above or below the conditions in the accompaniment-channel.

21. In a pneumatically-actuated musical instrument having a plurality of power-pneumatics and sound-producing devices operated thereby for a register of notes, a channel-board containing a melody-channel, and an accompaniment-channel, passages separately and individually connecting all the power-pneumatics throughout the register with the said channels, an inflating-valve to each power-pneumatic, a valve controlling communication between each power-pneumatic and the melody-channel, a second valve separately controlling communication between each power-pneumatic and the accompaniment-channel, pneumatically controlled selecting and actuating devices to each valve, an exhaust-bellows to each channel and means for operating one bellows separately of the other and at varying rates of speed to produce in the melody-channel varying conditions of tension either above or below the conditions in the accompaniment-channel.

22. In a pneumatically-actuated musical instrument, a plurality of power-pneumatics and sound-producing devices operated thereby for a register of notes, a melody-channel, and an accompaniment-channel, passages separately and individually connecting all the power-pneumatics throughout the register with the said channels, pneumatically-actuated means operating to separately connect each power-pneumatic with the said channels, a tracker board means controlled through said tracker-board and a note-sheet for selecting and bringing into action either of said connecting means with respect to any note in the register to connect the power-pneumatic of that note with either the melody-channel or the accompaniment-channel, and means controlled by the performer for varying the tension or degree of exhaust in either channel separately and either above or below the tension in the other channel.

23. In a pneumatically-actuated musical instrument, a plurality of power-pneumatics and sound-producing devices operated thereby for a register of notes, a channel-board containing a melody-channel, and an accompaniment-channel, passages separately and individually connecting all the power-pneumatics throughout the register with the said channels, pneumatically-actuated means operating to separately connect each power-pneumatic with the said channels, a tracker board means controlled through said tracker-board and a note-sheet for selecting and bringing into action either of said connecting means with respect to any note in the register to connect the power-pneumatic of that note with either the melody-channel or the accompaniment-channel, and means controlled by the performer for varying the tension or degree of exhaust in either channel separately and either above or below the tension in the other channel.

24. In a pneumatically-actuated musical instrument, a plurality of power-pneumatics and sound-producing devices operated thereby for a register of notes, a melody-channel, and an accompaniment-channel, passages separately and individually connecting all the power-pneumatics throughout the register with the said channels, an inflating-valve to every power-pneumatic, pneumatically-actuated means operating to separately connect each power-pneumatic with the said channel, a tracker board means controlled through said tracker-board and a note-sheet for selecting and bringing into action either of said connecting means with respect to any note in the register to connect the power-pneumatic of that note with either the melody-channel or the accompaniment-channel, and means controlled by the performer for varying the tension or degree of exhaust in either channel separately and either above or below the tension in the other channel.

25. In a pneumatically-actuated musical instrument, a plurality of power-pneumatics and sound-producing devices operated thereby for a register of notes, a channel-board containing a melody-channel, and an accompaniment-channel, passages separately and individually connecting all the power-pneumatics throughout the register with the said channels, an inflating-valve to every power-pneumatic, pneumatically actuated means operating to separately connect each power-pneumatic with the said channels, a tracker board means controlled through said tracker-board and a note-sheet for selecting and bringing into action either of said connecting means with respect to any note in the register to connect the power-pneumatic of that note with either the melody-channel or the accompaniment-channel, and means controlled by the performer for varying the tension or degree of exhaust in either channel separately and either above or below the tension in the other channel.

26. A valve-chest for power-pneumatics having two separate exhaust chambers of varying degrees of tension, a channel for every power-pneumatic through which the power pneumatic is connectible with either exhaust chamber, deflating valves separately controlling such connection, an inflating valve in said channel having a controlling valve, pneumatically actuated means for selecting and operating the valve of one exhaust chamber separately of the valve of the other exhaust chamber.

27. A valve-chest for power-pneumatics having two separate exhaust chambers of varying degrees of tension, a channel for every power-pneumatic through which the power-pneumatic is connectible with either exhaust chamber, deflating-valves separately controlling such connection, an inflating valve in said channel having a controlling valve, pneumatically actuated means for selecting and operating the valve of one exhaust chamber separately of the valve of the other exhaust-chamber and means for opening and closing the inflating valve in unison with the movements of either deflating-valve.

28. The combination of a power - pneumatic and striker, two separate exhaust chambers and valve mechanism arranged to separately control communication between the power-pneumatic and each of said exhaust chambers, and a pneumatic in each of said exhaust chambers arranged to control said valve mechanism.

29. The combination of a power - pneumatic and striker, two separate exhaust chambers, valve mechanism arranged to separately control communication between the power-pneumatic and each of said exhaust chambers, means in each of said chambers for operating said valves a storage bellows for each exhaust chamber and independent exhaust mechanism for each storage bellows.

30. The combination of a power pneumatic and striker, two separate exhaust chambers, valve mechanism arranged to separately control communication between the power pneumatic and each of said exhaust chambers, a channel communicating with one exhaust chamber, a separate channel connected with the other exhaust chamber, a bellows for each of said channels, and independent exhaust mechanism for each bellows.

31. The combination of a pneumatic and striker, two separate exhaust chambers, a channel connecting both said exhaust chambers with said pneumatic, valves in said channel controlling communication between said pneumatic and each of said exhaust chambers, and pneumatics in each of said exhaust chambers arranged to control said valves.

32. The combination of a pneumatic and striker, two separate exhaust chambers, a channel connecting both said exhaust chambers with said striker pneumatic, valves in said channel controlling communication between said striker pneumatic and with each of said exhaust chambers, means within said chambers for actuating said valves an inflating valve arranged to admit air into said connecting channel, and pneumatic means for actuating said inflating valve.

33. The combination with a plurality of power pneumatics each connected with separate exhaust chambers, said exhaust chambers extending horizontally lengthwise of the register and passing each other, means for exhausting air from said exhaust chambers, a valve chamber interposed between each of said exhaust chambers and the said means of exhaust, and a valve in each of said valve chambers adapted to control communication between such exhaust chamber and the said means of exhaust and means under the control of the operator for accurately adjusting the relation of exhaust in the exhaust chambers.

34. The combination with a plurality of power pneumatics each connected independently with separate exhaust chambers, said exhaust chambers extending horizontally lengthwise of the register and passing each other, means for exhausting air from said exhaust chambers, a valve chamber interposed between each of said exhaust chambers and the said means of exhaust, and a valve in each of said valve chambers adapted to control communication between such exhaust chamber and the said means of exhaust and means for accurately adjusting the relation of exhaust in the exhaust chambers, said means being under the control of the operator.

35. A pneumatic motor for an automatic or mechanical musical instrument or player; a plurality of exhaust ports in communication with said motor, separate controlling valves for the ports; a separate exhaust-chamber for each port, the several exhaust-chambers having different air tensions; and means for operating said valves independently.

36. A pneumatic motor for an automatic or mechanical musical instrument or player; a plurality of exhaust ports in communication with said motor, separate controlling-valves for the ports; a separate exhaust-chamber for each port, the several exhaust-chambers having different air-tensions; and means for operating said valves singly or in combination.

37. In a pneumatic action for an automatic or mechanical musical instrument or player; a pneumatic motor a plurality of exhaust ports in communication with said motor; separate controlling valves for said ports; an inlet for inflating the motor, the inlet having a valve normally open, and operative for ingress of air only when the exhaust ports are all closed; a separate air-chamber for each exhaust port, the several air-chambers having different air tensions; and means operated by a pneumatic tracker and perforated music-sheet, for operating the exhaust port valves singly or in combination.

38. A pneumatic motor for operating a single note-key of an automatic or mechanical musical instrument or player; exhaust ports in communication with the motor; a separate air-chamber for each port, independent valves for said ports the several air-chambers having different air tensions.

39. A pneumatic motor for operating a single note-key of an automatic or mechanical musical instrument or player; two or more exhaust ports in communication with the motor; a separate air-chamber for each port, the several chambers having air of different tensions; valves for all the ports; and means for operating the valves, singly or in combination.

40. In an automatic or mechanical musical instrument or player, a pneumatic motor; a tracker having a group of apertures for controlling a motor for operating a single sound-producing device; each of the apertures having an independent air-channel with means for operating the motor; a plurality of independent air-chambers the means controlled by one of the group of apertures operating the motor with air-exhaust of one tension; and the means controlled by another of the group of apertures, for operating the motor with air-exhaust of a different tension.

41. The combination of a pneumatic, independent valves controlling said pneumatic, a tracker-board and a single rocking valve controlled by said tracker-board and automatically alternately opening and closing ports communicating with the pneumatic.

42. The combination of a pneumatic, independent valves controlling said pneumatic, a tracker-board and a valve controlled by said tracker-board and automatically alternately controlling ports communicating with the pneumatic.

43. A pneumatic motor for an automatic or mechanical musical instrument or player, a plurality of exhaust ports in communication with said motor, separate controlling valves for the ports, a separate exhaust chamber for each port, the several exhaust chambers having different air tensions, means for operating the valves independently, a reservoir for each exhaust chamber, and exhausters for said reservoirs.

44. The combination with a striker for musical instruments, of a power-pneumatic for operating the striker, two separate exhaust chambers, separate mechanisms arranged to control communication between the power pneumatic and each of the exhaust chambers respectively, and means for operating said mechanisms.

45. The combination with a striker for musical instruments, of a power-pneumatic for operating the striker, a plurality of exhaust chambers each containing a valve mechanism for said power pneumatic to cause the power pneumatic to be operated from either of said chambers.

46. The combination of a pneumatic with a port leading therefrom, and a plurality of ports communicating therewith, valves controlling the last-mentioned ports, and a valve interposed between the first mentioned port and the other ports and automatically alternately opening communication between the first-mentioned port and one of the other ports and simultaneously closing communication with the other and a tracker-board controlling said valve.

47. In a device of the character described, the combination of a main pneumatic, a tracker board provided with separate ducts for controlling theme notes and accompaniment notes distinctively as such, and intermediate actuating devices connected with said main pneumatic and with said separate ducts, separate expression boxes for controlling the loudness of the theme notes and of the accompaniment notes distinctively as such, and means controllable at will for gradually changing the condition of said expression boxes independently of each other.

48. In an apparatus of the character described, the combination of a main pneumatic, separate mechanisms connected therewith for causing the same to strike a theme note or an accompaniment note distinctively as such, separate expression boxes connected with said mechanisms respectively, and means controllable at will for gradually opening and closing said expression boxes independently of each other, so as to vary the expression of the note struck.

49. In an apparatus of the character described, the combination of a main pneumatic, separate mechanisms connected therewith for causing said main pneumatic to strike a theme note or an accompaniment note distinctively as such, separate expression boxes for varying the loudness of the note thus struck, and means controllable at will while the device is in action, for controlling said expression boxes independently of each other.

50. In a device of the character described, the combination of a tracker board provided with ducts arranged in pairs, one duct of each pair being adapted to control a theme note only and the other duct of each pair being adapted to control an accompaniment note only, a music sheet provided with perforations so disposed relatively to each other as to act selectively upon the separate ducts of each pair, and separate mechanisms controllable at will during the operation of the device, for gradually varying the independent expression of the theme notes and of the accompaniment notes distinctively as such.

51. In a device of the character described, the combination of means for striking the theme notes and the accompaniment notes distinctively as such, independently of the relative position thereof in the musical scale, and means, controllable at will while the device is in action, for gradually changing the expression of said accompaniment notes as a whole, independently of said theme notes, so as to give the operator complete control, at all times, over the volume of sound of said accompaniment notes independently of the relative position thereof in the musical scale.

52. In a device of the character described, the combination of a tracker board, pneumatic connections extending therefrom and suitably disposed for governing the sounding of theme notes and accompaniment notes distinctively as such, independently of the relative position of said notes in the musical scale, and variable tension devices separately connected with different groups of said pneumatic connections and controllable at will independently of each other during the operation of the device, for governing the relative expression of the theme notes and the accompaniment notes independently of the relative position thereof in the musical scale.

53. In an apparatus of the character described, the combination of a tracker board provided with ducts arranged in pairs, one duct of each pair serving a theme note and the other duct thereof serving an accompaniment note distinctively as such, a pair of primary pneumatics connected with said ducts individually, a pair of secondary pneumatics connected individually with said primary pneumatics and controllable thereby independently of each other, a pair of separate exhaust boxes provided with valves controlled by said secondary pneumatics respectively, a pair of expression boxes which respectively and independently control the degree of exhaust of said exhaust boxes, means for changing at will the condition of said expression boxes, independently of each other, during the playing of the music, and a main pneumtic, arranged to be connected with either of said exhaust boxes and through the same with either of said expression boxes respectively, so as to be controllable thereby.

54. In a device of the character described, the combination of means for selectively striking the theme notes and the accompaniment notes distinctively as such, independently of the positions of said notes relatively to each other in the musical scale, and separate mechanisms, controllable at will during the operation of the device, for gradually but separately changing the expression of said theme notes and of said accompaniment notes, as such, independently of each other.

55. In a device of the character described, the combination of a tracker board provided with separate ducts for controlling theme and accompaniment notes as such, independently of the relative positions occupied by said notes in the musical scale, a music sheet provided with perforations so disposed as to act selectively as between said theme ducts and said accompaniment ducts, and manually operated mechanisms, controllable at will while the device is in action, for gradually changing, independently of each other, the expression of said theme notes as a whole and of said accompaniment notes as a whole.

56. In a device of the character described, the combination of a tracker board, provided with a pair of ducts, separate pneumatic connections extending from the respective ducts of said pair to two separate primary pneumatics, separate secondary pneumatics connected with said primary pneumatics respectively, separate exhaust boxes provided with puppet valves controlled by said secondary pneumatics, a main pneumatic controlled by the said puppet valves and operated by said exhaust boxes, and means controllable at will while the device is in action for varying the tension of said separate exhaust boxes independently of each other.

57. In a device of the character described, the combination of mechanism for striking notes on a musical instrument, separate expression boxes connected with said mechanism and provided with connections for controlling the volume of sound of said notes as theme notes or as accompaniment notes respectively independently of the relative position of said notes in the musical scale, and separate mechanisms each controllable manually while the device is in action for varying at will the respective conditions of said expression boxes independently of each other.

58. In a device of the character described, the combination of a main pneumatic, a pair of separate secondary pneumatics connected therewith, and adapted respectively to cause said main pneumatic to strike a theme note or an accompaniment note distinctively as such, and mechanism common to both of said secondary pneumatics and actuated by either thereof for allowing said main pneumatic to recover its normal position after striking a note.

59. In a device of the character described, the combination of a tracker board, having ducts disposed in pairs, each pair serving a single note, a music sheet provided with perforations disposed selectively with reference to the individual ducts of a pair, primary pneumatics disposed in pairs, and each connected with a single duct, secondary pneumatics disposed in pairs and each connected with a primary pneumatic, separate exhaust chambers, and separate mechanisms, controllable independently of each other while the apparatus is in action, for varying at will the air pressure of the respective exhaust chambers.

60. In an apparatus of the character described, the combination of a tracker board having ducts disposed in pairs, each pair serving a single note, a music sheet provided with perforations disposed selectively with reference to the individual ducts of a pair, a pair of exhaust boxes, a pair of expression boxes, and separate manually operated mechanisms for varying at will the air pressure of either of said exhaust boxes of a pair independently of the other exhaust box of a pair.

61. In an apparatus of the character described, the combination of a tracker board having ducts disposed in pairs, each pair serving a single note, a music sheet provided with perforations disposed selectively with reference to the individual ducts of a pair, primary pneumatics disposed in pairs, and each connected with a single duct, secondary pneumatics disposed in pairs and each connected with a primary pneumatic, exhaust boxes each capable of being connected with a main striking pneumatic, and means for varying at will while the apparatus is in action the air pressure of said exhaust boxes independently of each other.

62. In an apparatus of the character described, the combination of a tracker board provided with ducts arranged in pairs, one duct of each pair serving a theme note, and the other serving an accompaniment note, distinctively as such, primary pneumatics connected with said ducts individually, and controllable thereby independently of each other, a plurality of secondary pneumatics connected separately with said primary pneumatics, a plurality of exhaust boxes, a plurality of puppet valves, operated by said secondary pneumatics, and means controllable at will while the device is in action for changing the tension of said exhaust boxes independently of each other, and a single main pneumatic connected separately by the operation of said puppet valves with one or the other of said exhaust boxes, and controlled independently thereby, for striking a theme note or an accompaniment note distinctively as such.

63. In a device of the character described, the combination of means for selectively striking the theme notes and the accompaniment notes distinctively as such, independently of the relative position of said notes in the musical scale, and means for varying at will while the music is being played, the volume expression of said theme notes as a whole and said accompaniment notes as a whole, independently of each other.

64. In a device of the character described, the combination of a main pneumatic for striking a note, a pair of separate auxiliary pneumatics connected with said main pneumatic for deflating the same, and a valve connected with both of said auxiliary pneumatics and free to be actuated by either of them for inflating said main pneumatic.

65. In a device of the character described, the combination of a main pneumatic for striking a note, a pair of auxiliary pneumatics connected with said main pneumatic for separately actuating the same in one direction of its movement, a single valve for actuating said main pneumatic in the other direction of its movement, and a connection from said single valve to said auxiliary pneumatics.

66. In a device of the character described, the combination of a main pneumatic, auxiliary pneumatics connected therewith for separately deflating the same, a member common to both of said auxiliary pneumatics for inflating said main pneumatic, and means for connecting the said auxiliary pneumatics with said member.

67. In an automatic playing attachment for musical instruments, the combination of a main pneumatic and a tracker board having two channels for controlling said pneumatic, connections whereby one of said channels effects the operation of the main pneumatic under low tension and connections whereby the other channel effects the operation of the main pneumatic under high tension.

68. In an automatic piano player, the combination with power pneumatics and key operating devices, of a pair of pressure chambers, valves between each of said chambers and each of the power pneumatics whereby each power pneumatic may be connected to each pressure chamber, and means under the control of the operator for accurately adjusting the relation of pressure in the two chambers.

69. In a piano player, the combination with a divided pneumatic chamber, of the independent trunks connected thereto and having orifices, suitable controlling valves for the orifices, and independent exhaust reservoirs communicating with each trunk, and exhausters for each reservoir, and means for operating the exhausters as and for the purpose specified.

70. In a piano player, the combination with a divided pneumatic chamber, of the independent trunks connected thereto and having orifices, suitable controlling valves for the orifices, and independent exhaust reservoirs communicating with each trunk, and exhausters for each reservoir, the pedals, the rods connecting the ends of the exhausters to the ends of the pedals as and for the purpose specified.

71. The combination of a pair of independent exhaust boxes, a pair of manually operated expression boxes, independent of each other, for regulating the exhaust in said exhaust boxes respectively, a main pneumatic and automatic mechanism for making and breaking communication between said main pneumatic and either of said exhaust boxes together with the expression box appertaining thereto.

72. The combination of striking mechanism, a main pneumatic for operating the same, separate exhaust chambers having air pressures independent in degree for operating said main pneumatic as a theme note or as an accompaniment note, separate expression boxes connected with said exhaust chambers and separately adapted to control the expression of the particular note struck by said main pneumatic, and means for making and breaking communication between said main pneumatic and the respective expression boxes.

73. In a device of the character described, the combination of a tracker board, provided with a pair of ducts, separate pneumatic connections extending from the respective ducts of said pair to two separate primary pneumatics, separate exhaust boxes provided with valves controlled by said pneumatics, a main pneumatic controlled by the said valves and operated by said exhaust boxes, and means controllable at will while the device is in action for varying the tension of said separate exhaust boxes independently of each other.

GEORGE P. BRAND.

Witnesses:
 EDWARD E. OSBORN,
 M. REGNER.